United States Patent
Sartorius et al.

(10) Patent No.: US 7,711,927 B2
(45) Date of Patent: May 4, 2010

(54) SYSTEM, METHOD AND SOFTWARE TO PRELOAD INSTRUCTIONS FROM AN INSTRUCTION SET OTHER THAN ONE CURRENTLY EXECUTING

(75) Inventors: Thomas Andrew Sartorius, Raleigh, NC (US); Brian Michael Stempel, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 11/685,850

(22) Filed: Mar. 14, 2007

(65) Prior Publication Data
US 2008/0229069 A1 Sep. 18, 2008

(51) Int. Cl.
*G06F 9/30* (2006.01)
(52) U.S. Cl. ............ 712/213; 712/207; 712/E9.016; 712/220
(58) Field of Classification Search ........ 712/207, 712/213, E9.016, 220
See application file for complete search history.

(56) References Cited

U.S. PATENT DOCUMENTS

| | | | |
|---|---|---|---|
| 5,335,331 A * | 8/1994 | Murao et al. | 712/213 |
| 5,819,056 A * | 10/1998 | Favor | 712/204 |
| 5,822,559 A * | 10/1998 | Narayan et al. | 712/214 |
| 6,021,265 A | 2/2000 | Nevill | |
| 6,081,884 A | 6/2000 | Miller | |
| 6,356,997 B1 * | 3/2002 | Krishnan et al. | 712/237 |
| 6,374,348 B1 * | 4/2002 | Irie et al. | 712/237 |
| 6,564,298 B2 | 5/2003 | Jourdan et al. | |
| 6,816,962 B2 * | 11/2004 | Augsburg et al. | 712/226 |
| 7,093,108 B2 * | 8/2006 | Swaine | 712/227 |
| 7,353,363 B2 * | 4/2008 | Chaudhry et al. | 712/209 |
| 7,360,060 B2 * | 4/2008 | Chauvel et al. | 712/209 |
| 2002/0004897 A1 * | 1/2002 | Kao et al. | 712/227 |
| 2003/0182535 A1 * | 9/2003 | Kadowaki | 712/207 |
| 2004/0024990 A1 * | 2/2004 | Chauvel et al. | 712/209 |
| 2004/0133764 A1 | 7/2004 | O'Connor | |
| 2005/0262329 A1 | 11/2005 | Krishnan et al. | |
| 2006/0200686 A1 * | 9/2006 | Stempel et al. | 713/300 |
| 2006/0265573 A1 * | 11/2006 | Smith et al. | 712/213 |
| 2007/0260854 A1 * | 11/2007 | Smith et al. | 712/213 |

FOREIGN PATENT DOCUMENTS

EP 0411747 2/1991
WO 2006125219 11/2006

OTHER PUBLICATIONS

International Search Report and Written Opinion-PCT/US08/057064, Internal Search Authority-European Patent Office-07-09-08.

* cited by examiner

*Primary Examiner*—David J Huisman
*Assistant Examiner*—Idriss N Alrobaye
(74) *Attorney, Agent, or Firm*—Nicholas J. Pauley; Peter Kamarchik; Sam Talpalatsky

(57) ABSTRACT

An instruction preload instruction executed in a first processor instruction set operating mode is operative to correctly preload instructions in a different, second instruction set. The instructions are pre-decoded according to the second instruction set encoding in response to an instruction set preload indicator (ISPI). In various embodiments, the ISPI may be set prior to executing the preload instruction, or may comprise part of the preload instruction or the preload target address.

19 Claims, 2 Drawing Sheets

SYSTEM, METHOD AND SOFTWARE TO PRELOAD INSTRUCTIONS FROM AN INSTRUCTION SET OTHER THAN ONE CURRENTLY EXECUTING

BACKGROUND

The present invention relates generally to the field of processors and in particular to a system and method for pre-loading instructions and pre-decoding the pre-loaded instructions according to an instruction set other than a currently executing instruction set.

Microprocessors perform computational tasks in a wide variety of applications. Improved processor performance is almost always desirable, to allow for faster operation and/or increased functionality through software enhancements. By exploiting both architectural advances, such as RISC architectures, and advances in semiconductor technology, many modern processors execute at clock speeds much higher than memory chips, such as DRAM and SDRAM. To minimize the penalty of relatively slow memory accesses, these processors utilize a hierarchical memory structure, with fast, on-chip cache memories storing local copies of data and instructions that have been recently accessed and/or that the processor anticipates (via software) accessing in the near future.

One example of anticipating loads to an instruction cache is a preload instruction (e.g., the ARM instruction PLI). A preload instruction loads instructions into the instruction cache in advance of their execution. A programmer may insert a preload instruction into code somewhat ahead of a known or anticipated branch, such as a subroutine call, to a target. The preload instruction loads instructions at the target into the instruction cache, so that when the branch executes, instructions at the target are available in the cache for immediate execution. Instructions to be loaded into a cache in response to a preload instruction are referred to herein as pre-loaded instructions.

Most modern processors employ a pipelined architecture, where sequential instructions are overlapped in execution to increase overall processor throughput. Maintaining smooth execution through the pipeline is critical to achieving high performance. One pipeline optimization technique known in the art is pre-decoding instructions. Instructions are examined as they are read from memory, are partially decoded, and some information about the instructions—known as pre-decode information—is stored in an instruction cache along with the associated instructions. When the instructions are later fetched into the pipeline from the cache, the pre-decode information is also fetched, and is used to assist in fully decoding the instructions. Pre-decode information may, for example, identify branch and floating-point instructions, identify the length of an instruction in a variable-length instruction set architecture, or other information useful in executing the instructions in the pipeline.

Some modern processors are able to execute instructions according to two or more instruction set encodings. For example, a processor may have a 32-bit native instruction set, and additionally include the ability to execute. Java byte codes. As another example, several versions of the ARM processor architecture execute 32-bit ARM instruction encodings in an ARM instruction set operating mode, and 16-bit or 32-bit Thumb instruction encodings in a Thumb instruction set operating mode. Programmers explicitly set the proper instruction set operating mode in software, prior to executing instructions according to the relevant instruction set encoding.

When a conventional processor having a pre-decoder executes a preload instruction, the pre-loaded instructions are pre-decoded according to the current instruction set operating mode. If a programmer wishes to preload instructions in an instruction set different from the current processor instruction set operating mode—for example in anticipation of a branch to code section written in a different instruction set—he must change the instruction set mode prior to executing the preload instruction.

For example, a program executing ARM instructions in ARM mode may change to Thumb mode and branch to a code segment executing only Thumb instructions. To preload the Thumb instructions with correct pre-decoding, the program must switch the current processor instruction set operating mode from ARM to Thumb, execute a preload instruction with the target address of the Thumb code, then switch back to ARM mode to execute the remaining ARM instructions, prior to the branch into the Thumb code section.

Failure to enter Thumb mode to execute the preload instruction would cause the pre-decoder to incorrectly pre-decode the pre-loaded Thumb instructions according to ARM instruction set encodings. If this occurred, when fetched from the instruction cache the pre-decode information would be useless and the Thumb instructions would have to be re-fetched, incurring a delay that the preload was meant to obviate. In addition, in an instruction cache having an ARM/Thumb bit as part of the tag, the re-fetched Thumb instructions would be allocated a separate cache line, and the Thumb instructions incorrectly pre-decoded as ARM instructions would remain in the cache, wasting cache space and hence lowering the cache hit rate and system performance.

In many processors, the overhead involved in switching the current processor instruction set operating mode twice to execute a single preload instruction may outweigh the benefit of pre-loading instructions in the anticipated instruction set.

SUMMARY

According to one or more embodiments disclosed and claimed herein, a preload instruction executed in a first processor instruction set operating mode is operative to preload instructions in a different, second instruction set. The instructions are pre-decoded according to the second instruction set encoding in response to an instruction set preload indicator (ISPI). In various embodiments, the ISPI may be set prior to executing the preload instruction, or may comprise part of the preload instruction or the preload target address.

One embodiment relates to a method of preloading instructions. An instruction set preload indicator, indicating one of a plurality of instruction sets, is set. An instruction operative to preload instructions into an instruction cache is executed. The preloaded instructions are pre-decoded according to an instruction set other than a current processor instruction set mode in response to the instruction set preload indicator.

Another embodiment relates to a processor. The processor includes a memory interface and an instruction cache operative to store instructions. The processor also includes an instruction execution unit operative to retrieve the instructions and pre-decode information from the instruction cache and to execute the instructions according to a processor instruction set operating mode, and further operative to generate an instruction set preload indicator. The processor further includes a pre-decoder interposed between the instruction cache and the memory interface and operative to pre-decode instructions according to an instruction set other than the current processor instruction set operating mode in response to the instruction set preload indicator, upon execution of an instruction operative to preload instructions into the instruction cache.

Still another embodiment relates to a computer readable medium storing at least a preload instruction in a first instruction set, the instruction operative to cause a processor to preload instructions into an instruction cache, wherein the pre-loaded instructions are pre-decoded according to a different, second instruction set.

DETAILED DESCRIPTION

Figure 1:
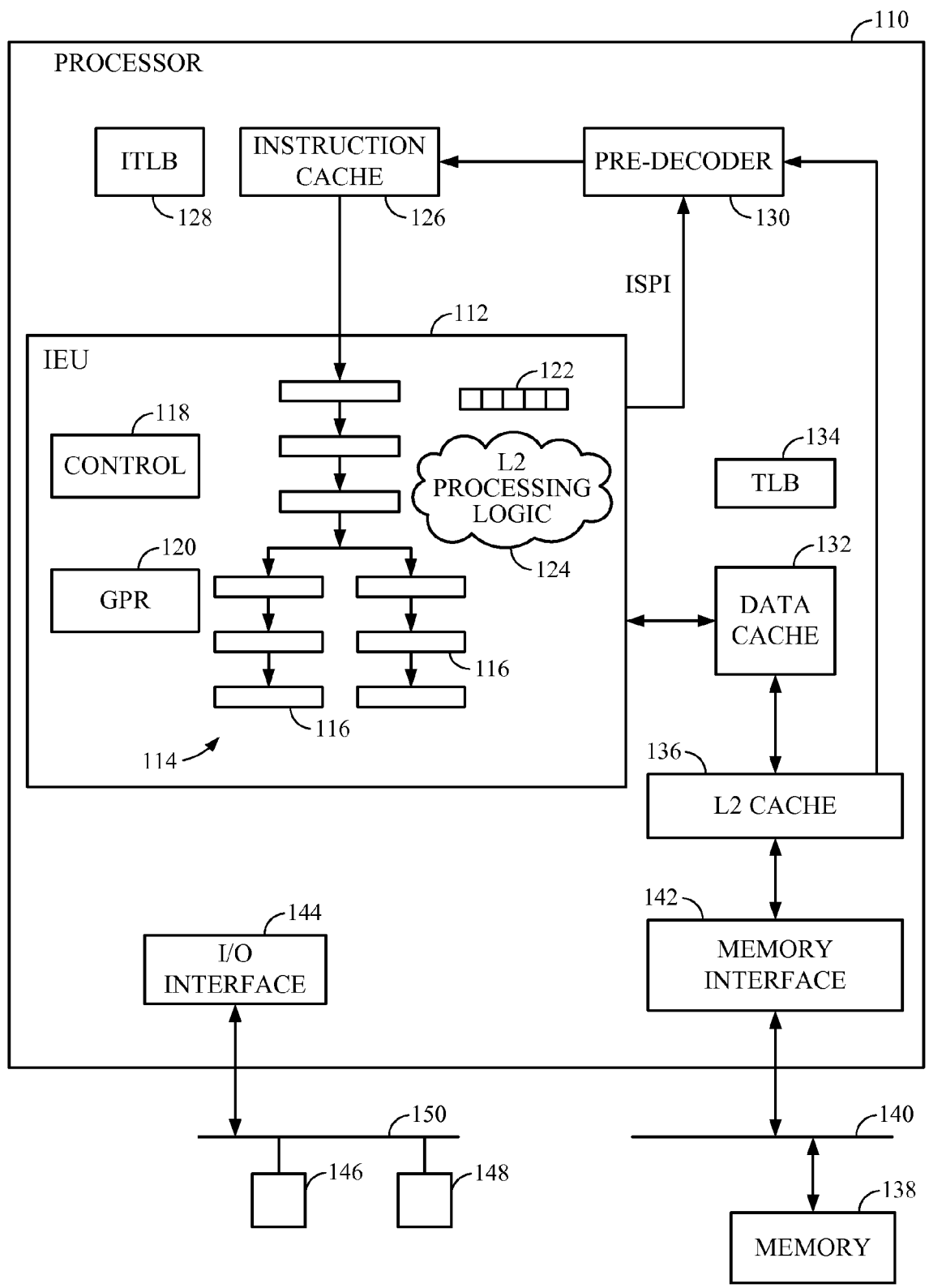
FIG. 1 is a functional block diagram of a processor capable of pre-decoding pre-loaded instructions according an instruction set other than the current processor instruction set mode.

FIG. 1 depicts a functional block diagram of a processor 110 that executes instructions encoded according to a plurality of different instruction set encodings. The processor 110 is capable of pre-decoding pre-loaded instructions according an instruction set other than the current processor instruction set mode.

The processor 110 executes instructions in an instruction execution unit 112 that includes a pipeline 114 comprising a plurality of registers or latches 116, organized in pipe stages, as well as logical and computational circuits such as Arithmetic Logic Units (ALU) (not shown). The pipeline executes instructions according to control logic 118. The pipeline 114 may be a superscalar design, as shown. A General Purpose Register (GPR) file 120 provides registers comprising the top of a memory hierarchy. The instruction execution unit also includes a status register 122 that indicates, for example, the current processor instruction set operating mode, which defines one of a plurality of instruction set encodings under which instructions are decoded and executed. The instruction execution unit 112 also includes L2 processing logic 124 that tracks properties of instructions and data fetched from an L2 cache memory 136 or main memory 138.

The pipeline 114 fetches instructions from an instruction cache 126, with memory addressing and permissions managed by an Instruction-side Translation Lookaside Buffer (ITLB) 128. A pre-decoder 130 pre-decodes instructions fetched from the L2 cache 136 (or main memory 138) and places the instructions and pre-decode information into the instruction cache 126. As discussed in greater detail herein, the pre-decoder 130 pre-decodes pre-loaded instructions according to an instruction set different than the current processor instruction set operating mode, in response to an instruction set preload indicator (ISPI) from the instruction execution unit 112.

Data is accessed from a data cache 132, with memory addressing and permissions managed by a main Translation Lookaside Buffer (TLB) 134. In various embodiments, the ITLB 128 may comprise a copy of part of the TLB 134. Alternatively, the ITLB 128 and TLB 134 may be integrated. Similarly, in various embodiments of the processor 110, the instruction cache 126 and data cache 132 may be unified.

Misses in the instruction cache 126 and data cache 132 cause an access to Level-2 (L2) cache memory 136 which, in the embodiment depicted in FIG. 1, is integrated. Misses in the L2 cache 136 cause an access to main (off-chip) memory 138 over a system bus 140, under the control of a memory interface 142. The processor 110 may include an Input/Output (I/O) interface 144, controlling access to various peripheral devices 146, 148 across a peripheral bus 150. As well known in the art, the processor 110 executes instructions retrieved from a computer readable medium, such as memory 136, or magnetic or optical media read by a peripheral 146, 148.

Those of skill in the art will recognize that numerous variations of the processor 110 are possible. For example, the processor 110 may include a Level-3 (L3) or additional cache, and/or a separate L2 cache 136 may be dedicated to each of the instruction and data caches 126, 132. In addition, one or more of the functional blocks depicted in the processor 110 may be omitted from a particular embodiment.

The processor 110 executes instructions according to the current processor instruction set mode, as indicated for example in the status register 122. To allow the pre-loading—with correct pre-decoding—of instructions in a different instruction set, the instruction execution unit 112 generates an instruction set preload indicator (ISPI), and provides the ISPI to the pre-decoder 130 upon executing a preload instruction. If the processor 110 supports two instruction set encodings (e.g., ARM and Thumb), the ISPI may comprise a single bit. If the processor 110 supports more than two instruction set encodings, the ISPI may comprise a multi-bit value, and may comprise a separate flag for each instruction set, or may encode an instruction set indication in a binary value, as well known in the art. The ISPI may be generated in a variety of ways.

In one embodiment, one or more unused address bits of the preload instruction target address are encoded as the ISPI. A preload instruction (e.g., PLI) takes a target address as an operand. The instruction address may be decomposed into, for example, a tag, a set number, and a cache line offset. For example, for a 32-bit instruction virtual address VA[31:0], the tag, which is compared against tags stored in a CAM structure of the instruction cache 126, may comprise VA[31:11]. In an n-way set associative cache, the set number selects from among n results returned if the tag matches. The set number may comprise VA[10:5]. The offset, VA[4:0], addresses individual instructions in the cache line, that are stored in a RAM structure of the instruction cache 126 (along with pre-decode information).

A preload instruction loads a fixed-sized block of memory into each cache line. If all of the instructions are of the same length, a fixed number of instructions are loaded into the cache line. In a variable-length instruction set, or if the cache line includes instructions encoded according to different instructions sets having different length instructions, the number of instructions in the cache line is not known upon loading the instructions into the instruction cache. In either event, however, the amount of data to be loaded into the instruction cache line is known, and accordingly the preload instruction does not utilize the cache line offset portion of the address.

According to one embodiment, the cache line offset, e.g., VA[4:0], is used to encode the instruction set preload indicator (ISPI). In particular, in an embodiment where the processor 110 executes instructions from two instruction sets, the ISPI is the least significant bit VA[0]. As one non-limiting example, VA[0]=0 may indicate ARM instructions, and VA[0]=1 may indicate Thumb instructions. Of course, other ISPI encodings are possible, and depend on the number and type of instruction sets the processor 110 supports.

The ISPI is encoded into the cache line offset portion of a preload target address when the address is determined and written to a compiler-specified GPR in preparation for execution of an associated preload instruction. When the preload instruction executes, it reads a target address from the specified GPR register, and preloads a block of data at the target address into a cache line determined by the tag and set number portions of the address. If the address hits in the instruction cache, the preload instruction execution is complete. If the address misses in the instruction cache, logic within the instruction execution unit 112, such as L2 processing logic 124, performs miss processing, accessing the L2 cache 136 and, if necessary, main memory 138 to retrieve the instructions.

When a block of data containing instructions is loaded into the pre-decoder 130, the L2 processing logic 124 presents the ISPI to the pre-decoder 130. In response to the ISPI, the pre-decoder 130 pre-decodes instructions according to the indicated instruction set, regardless of the current instruction set operating mode of the processor 110. The pre-decoder 130 then writes the instructions, along with the correct pre-decode information, to the instruction cache 126. In one embodiment, the pre-decoder 130 receives an indication of a preload instruction execution and examines the ISPI in response to such indication (ignoring the ISPI for normal instruction cache line fetches). In another embodiment, logic in the instruction execution unit 112, such as the L2 processing logic 124 may combine the ISPI with knowledge of a preload instruction execution, and present to the pre-decoder 130 an indication of the instruction set by which currently fetched instructions should be pre-decoded. In either case, the pre-decoder 130 pre-decodes pre-loaded instructions according to a particular instruction set in response to the ISPI.

In one embodiment, the above-described pre-decoding of pre-loaded instructions according to the ISPI is selectively enabled, to provide backward compatibility. In particular, an interworking mode is defined. The interworking mode may be indicated by a bit in the status register 122. When the interworking mode is enabled, the pre-decoding of pre-loaded instructions depends on the ISPI, as described above. When the interworking mode is disabled, instructions are pre-decoded according to the processor instruction set mode that is active when the preload instruction is executed.

In one embodiment, the instruction set preload indicator (ISPI) comprises one or more bits in a register, such as the status register 122. In this embodiment, the ISPI bits are explicitly set prior to execution of a preload instruction. Upon execution of the preload instruction, the pre-decoder 130 inspects the ISPI bits in the status register 122 or other register, and pre-decodes the pre-loaded instructions according to the instruction set encoding indicated by the ISPI bits (regardless of the processor instruction set mode that is active at the time). The instructions and pre-decode information are then written to the instruction cache 126. In one embodiment, the pre-decoding of pre-loaded instructions according to the ISPI is selectively enabled by an interworking mode, as described above. In one embodiment, the ISPI bits may be gated by the interworking mode indicator bit.

In one embodiment, the instruction set preload indicator (ISPI) comprises one or more bits in the op code of the preload instruction. A bit field of the preload instruction op code may be defined for the ISPI, and a compiler may set the ISPI bit field according to a programmer's instructions or directives in code. Upon execution of the preload instruction, the ISPI bit field is presented to the pre-decoder 130, such as by the L2 processing logic 124, and the pre-decoder 130 pre-decodes the pre-loaded instructions according to the indicated instruction set encoding. The instructions and pre-decode information are then written to the instruction cache 126.

In one embodiment, two or more separate preload instructions are defined for preloading instructions in different instructions sets. As a non-limiting example, an ARM instruction set may include a conventional preload instruction that preloads data into the instruction cache 126, with the pre-decoder 130 pre-decoding the pre-loaded instructions as ARM instructions. In addition, the ARM instruction set may also include a separate, alternate instruction set preload instruction (e.g., PLI2) that preloads data into the instruction cache 126, with the pre-decoder 130 pre-decoding the pre-loaded instructions as Thumb instructions. Similarly, the Thumb instruction set may include separate preload instructions for pre-loading data that is pre-decoded according to Thumb or ARM instruction set encodings. This allows programmers to explicitly preload instructions from the desired instruction set by utilizing the appropriate preload instructions in code.

Those of skill in the art will recognize that the above-described embodiments are not mutually exclusive. For example, a preload instruction having an ISPI bit field in the op code or a unique preload instruction may, in particular implementations, present the ISPI to the pre-decoder 130 by latching the ISPI into a register such as the status register 122, or by substituting the ISPI into one or more unused address bits in the preload target address. In general, given the teachings of the present disclosure, those of skill in the art may ascertain the best solution for preloading instructions in different instruction sets for a given application.

Figure 2:
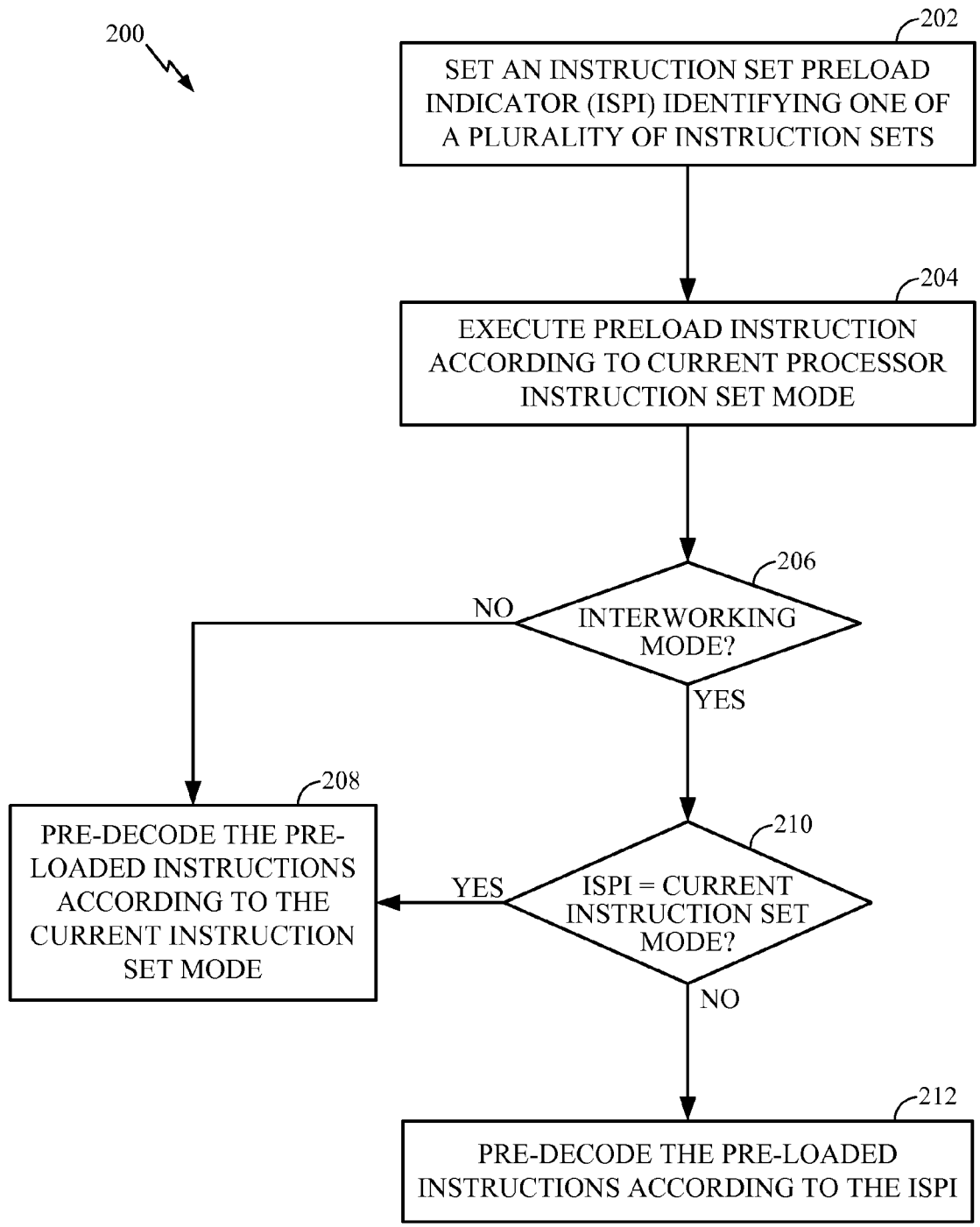
FIG. 2 is a flow diagram of a method of pre-loading instructions in one of a plurality of instruction sets.

FIG. 2 depicts a method 200 of preloading instructions. The method begins by setting an instruction set preload indicator (ISPI) (block 202). The ISPI uniquely identifies one of a plurality of instruction sets supported by the processor 110. In various embodiments, the ISPI may be set by altering a preload instruction target address, setting ISPI bits in a register such as the status register 122, setting an ISPI bit field in a preload instruction op code, or selecting a unique preload instruction.

A preload instruction is executed in the current processor instruction set mode (block 204). The preload instruction is operative to load instructions into the instruction cache 126 in advance of the pre-loaded instructions' execution. In one embodiment, pre-decoding of the pre-loaded instructions depends on the interworking mode. If the interworking mode is not enabled (block 206), the pre-decoder 130 pre-decodes the pre-loaded instructions according to the current instruction set mode (block 208). If the interworking mode is enabled (block 206), and the ISPI indicates or identifies an instruction set other than the current instruction set mode (block 210), the pre-decoder 130 pre-decodes the pre-loaded instructions according to the instruction set indicated by the ISPI (block 212).

According to one or more embodiments described and claimed herein, programmers may preload instructions into an instruction cache 126 while executing instructions from a first instruction set, with the pre-loaded instructions pre-decoded according to a second, different instruction set. In this manner, the execution of code that switches between instruction sets may be optimized by ensuring that instructions in a given instruction set are available in an instruction cache 126 prior to branching to code written in that instruction set. The communication to a pre-decoder 130 of an instruction set preload indicator (ISPI) may be implemented in a variety of ways.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of preloading instructions, the method comprising:
   setting an instruction set preload indicator identifying one of a plurality of instruction sets, the instruction set preload indicator generated by an instruction execution unit;
   executing, according to a current processor instruction set operating mode, an instruction operative to preload instructions into an instruction cache;
   providing the instruction set preload indicator to a pre-decoder upon executing the instruction operative to preload instructions into an instruction cache;
   pre-decoding the pre-loaded instructions according to an instruction set operating mode other than the current processor instruction set operating mode in response to the instruction set preload indicator generated by the instruction execution unit;
   wherein the instruction execution unit includes processing logic operative to track properties of instructions and data fetched from a second cache memory, wherein the second cache memory is interposed between the instruction cache and a memory interface and wherein the pre-decoder is interposed between the instruction cache and the second cache memory; and
   wherein the pre-loaded instructions are pre-decoded according to an instruction set operating mode other than the current processor instruction set operating mode in an interworking mode, and are otherwise pre-decoded according to the current processor instruction set operating mode, wherein the interworking mode is indicated by an interworking mode indicator bit in a status register and wherein one or more bits of the instruction set preload indicator are gated by the interworking mode indicator bit.

2. The method of claim 1, wherein the instruction set preload indicator comprises one or more bits of an address of a cache line into which the instructions are preloaded.

3. The method of claim 2, wherein the instruction set preload indicator comprises a least significant bit in an instruction cache line address.

4. The method of claim 1, wherein the instruction set preload indicator comprises one or more bits in an op code of the instruction operative to preload the instructions into the instruction cache.

5. The method of claim 1, wherein the instruction operative to preload the instructions into the instruction cache is a unique preload instruction in a first instruction set that causes pre-loaded instructions to be pre decoded according to a second instruction set different from the first instruction set, and wherein setting the instruction set preload indicator comprises selecting the unique preload instruction.

6. The method of claim 1, wherein setting the instruction set preload indicator comprises setting one or more bits in a register prior to executing the instruction operative to preload the instructions into the instruction cache.

7. A processor comprising:
   a memory interface;
   an instruction cache operative to store instructions and pre-decode information;
   an instruction execution unit operative to retrieve the instructions from the instruction cache, to execute the instructions according to a current processor instruction set operating mode, and to generate an instruction set preload indicator;
   a pre-decoder interposed between the instruction cache and the memory interface and operative to pre-decode pre-loaded instructions according to an instruction set operating mode other than the current processor instruction set operating mode in response to the instruction set preload indicator provided to the pre-decoder by the instruction execution unit upon execution of an instruction operative to preload instructions into the instruction cache;
   a second cache memory interposed between the instruction cache and the memory interface and wherein the pre-decoder is interposed between the instruction cache and the second cache memory, wherein the instruction execution unit includes processing logic operative to track properties of instructions and data fetched from the second cache memory; and
   wherein the pre-decoder is operative to pre-decode the pre-loaded instructions according to the instruction set operating mode other than the current processor instruction set operating mode in an interworking mode, and is otherwise operative to pre-decode the pre-loaded instructions according to the current processor instruction set operating mode, wherein the interworking mode is indicated by an interworking mode indicator bit in a status register and wherein one or more bits of the instruction set preload indicator are gated by the interworking mode indicator bit.

8. The processor of claim 7, wherein the instruction execution unit generates the instruction set preload indicator by setting one or more bits of an address of a cache line into which the instructions are preloaded.

9. The processor of claim 8, wherein an instruction preload cache line address is an operand of the instruction operative to preload the instructions into the instruction cache.

10. The processor of claim 9, wherein the instruction preload cache line address is written to a compiler-specified general purpose register that is read by the instruction operative to preload the instructions into the instruction cache.

11. The processor of claim 7, wherein the instruction execution unit generates the instruction set preload indicator in response to one or more bits in an op code of the instruction operative to preload the instructions into the instruction cache.

12. The processor of claim 7, wherein the instruction operative to preload the instructions into the instruction cache is a unique preload instruction that causes the pre-loaded instructions to be pre-decoded according to a predetermined instruction set, and wherein the instruction execution unit generates the instruction set preload indicator by executing the unique preload instruction.

13. The processor of claim 7, further comprising a register, and wherein the instruction execution unit generates the instruction set preload indicator by setting one or more predetermined bits in the register.

14. The processor of claim 7, wherein the pre-decoder is operative to receive an indication of a preload instruction execution and to examine the instruction set preload indicator in response to the indication of the preload instruction execution.

15. The processor of claim 7, wherein the processing logic is operative to present the instruction set preload indicator to the pre-decoder when a block of data containing instructions is loaded into the pre-decoder.

16. The processor of claim 7, wherein the processing logic is operative to present to the pre-decoder an indication of an instruction set by which currently fetched instructions are to be pre-decoded in response to an indicator of a preload instruction execution and the instruction set preload indicator.

17. A computer readable medium storing at least a preload instruction in a first instruction set, according to a current processor instruction set operating mode, the preload instruction operative to cause a processor to preload instructions into an instruction cache, wherein the pre-loaded instructions are pre-decoded according to a different, second instruction set in response to an instruction set preload indicator generated by an instruction execution unit and provided by the instruction execution unit to a pre-decoder upon executing the preload instruction; wherein the instruction execution unit includes processing logic operative to track properties of instructions and data fetched from a second cache memory, wherein the second cache memory is interposed between the instruction cache and a memory interface and wherein the pre-decoder is interposed between the instruction cache and the second cache memory; and wherein the pre-loaded instructions are pre-decoded according to an instruction set operating mode other than the current processor instruction set operating mode in an interworking mode, and are otherwise pre-decoded according to the current processor instruction set operating mode, wherein the interworking mode is indicated by an interworking mode indicator bit in a status register and wherein one or more bits of the instruction set preload indicator are gated by the interworking mode indicator bit.

18. The computer readable medium of claim 17, wherein a preload instruction op code includes an instruction set preload indicator bit field, wherein the instruction set preload indicator is presented to the pre-decoder by latching the instruction set preload indicator into a status register of the instruction execution unit.

19. The computer readable medium of claim 17, wherein a preload instruction op code includes an instruction set preload indicator bit field and wherein the instruction set preload indicator is presented to the pre-decoder by substituting the instruction set preload indicator into one or more unused address bits in a preload target address.

* * * * *

UNITED STATES PATENT AND TRADEMARK OFFICE
CERTIFICATE OF CORRECTION

| | | |
|---|---|---|
| PATENT NO. | : 7,711,927 B2 | Page 1 of 1 |
| APPLICATION NO. | : 11/685850 | |
| DATED | : May 4, 2010 | |
| INVENTOR(S) | : Sartorius et al. | |

It is certified that error appears in the above-identified patent and that said Letters Patent is hereby corrected as shown below:

Column 7, line 56, claim 5: "pre decoded" to read as --pre-decoded--

Signed and Sealed this
Twelfth Day of July, 2011

David J. Kappos
*Director of the United States Patent and Trademark Office*